US012425381B2

(12) United States Patent
Lidzborski

(10) Patent No.: US 12,425,381 B2
(45) Date of Patent: *Sep. 23, 2025

(54) HYBRID CONTENT PROTECTION ARCHITECTURE FOR EMAIL

(71) Applicant: Google LLC, Mountain View, CA (US)

(72) Inventor: Nicolas Lidzborski, Belmont, CA (US)

(73) Assignee: Google LLC, Mountain View, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 18/350,451

(22) Filed: Jul. 11, 2023

(65) Prior Publication Data

US 2023/0353548 A1 Nov. 2, 2023

Related U.S. Application Data

(63) Continuation of application No. 17/649,675, filed on Feb. 1, 2022, now Pat. No. 11,736,462.

(51) Int. Cl.
*H04L 9/40* (2022.01)
*H04L 9/32* (2006.01)
*H04L 51/212* (2022.01)

(52) U.S. Cl.
CPC .......... *H04L 63/0485* (2013.01); *H04L 9/321* (2013.01); *H04L 51/212* (2022.05)

(58) Field of Classification Search
CPC ... H04L 63/0485; H04L 9/321; H04L 51/212; H04L 9/40; H04L 9/32
See application file for complete search history.

(56) References Cited

U.S. PATENT DOCUMENTS 7,178,021 B1 * 2/2007 Hanna ................... H04L 9/0825
713/150
10,033,703 B1 7/2018 Sharifi Mehr
(Continued)

FOREIGN PATENT DOCUMENTS

| CN | 107491296 A | 12/2017 |
|---|---|---|
| EP | 2112625 A2 | 10/2009 |
| JP | H10-40100 A | 2/1998 |

OTHER PUBLICATIONS

Anonymous: "Google Cloud Security Whitepapers Google Cloud Infrastructure Security Design Overview", Mar. 31, 2018 (Mar. 31, 2018), XP055776854.

(Continued)

*Primary Examiner* — Quazi Farooqui
(74) *Attorney, Agent, or Firm* — Honigman LLP; Brett A. Krueger

(57) ABSTRACT

A computer-implemented method when executed by data processing hardware of a user device causes the data processing hardware to perform operations. The operations include obtaining, from a message server, an encrypted message encrypted by a single-use data encryption key (DEK) and an encrypted DEK including the single-use DEK encrypted by a public key (PK). The operations also include transmitting, to a key access control list server (KACLS), a decryption request requesting the KACLS decrypt the encrypted DEK with a PRK associated with the PK. The decryption request includes the encrypted DEK. The KACLS is independent from the message server. The operations also include receiving, from the KACLS, the single-use DEK and decrypting, using the single-use DEK, the encrypted message.

20 Claims, 6 Drawing Sheets

(56) References Cited

U.S. PATENT DOCUMENTS

| | | |
|---|---|---|
| 11,483,305 B2 | 10/2022 | Ilic et al. |
| 2014/0369498 A1 | 12/2014 | Hammersmith |
| 2018/0091484 A1* | 3/2018 | Atta .......................... G06F 9/50 |
| 2019/0130128 A1 | 5/2019 | Khassanov et al. |

OTHER PUBLICATIONS

Barnes Cisco K Bhargavan B Lipp Inria C A Wood Cloudflare R L: "Hybrid Public Key Encryption draft-irtf-cfrg-hpke-12; draft-irtf-cfrg-hpke-12.txt", Hybrid Public Key Encryption DRAFT-IRTF-CFRG-HPKE-12; DRAFT-IRTF-CFRG-HPKE-12.TXT; Internet-Draft: Internet Research Task Force (IRTF), Internet Engineering Task Force, IETF; Standardworkingdraft, Int, No. 12 Sep. 2, 2021 (Sep. 2, 2021), pp. 1-105, XP015147643.

Hobson, F., What is an IdP (Identity Provider) and why do you need one?, [online], Aug. 21, 2020, <available at: https://www.ubisecure.com/identity-provider/what-is-anidentity-provider-idp/>.

Japanese Office Action for the related JP application No. 2024-544987 dated Jun. 20, 2025.

\* cited by examiner

HYBRID CONTENT PROTECTION ARCHITECTURE FOR EMAIL

CROSS REFERENCE TO RELATED APPLICATIONS

This U.S. Patent Application is a continuation of, and claims priority under 35 U.S.C. § 120 from, U.S. patent application Ser. No. 17/649,675, filed on Feb. 1, 2022. The disclosure of this prior application is considered part of the disclosure of this application and is hereby incorporated by reference in its entirety.

TECHNICAL FIELD

This disclosure relates to hybrid content protection architecture for message services such as email.

BACKGROUND

Encryption is increasingly one of the most important tools in use to ensure confidentiality and authenticity of messages between users. These messages are often passed through message servers (e.g., email servers) that are not under the control of the user sending and/or the user receiving the message. While the users can rely on the email servers for encryption and decryption, this allows the email servers access to the unencrypted messages. In order to maximize privacy, some users employ client-side encryption which involves users encrypting messages prior to sending the encrypted message to the message server for delivery.

SUMMARY

One aspect of the disclosure provides a method for providing a hybrid content protection architecture. The computer-implemented method, when executed by data processing hardware of a user device, causes the data processing hardware to perform operations. The operations include obtaining, from a message server, an encrypted message encrypted by a single-use data encryption key (DEK) and an encrypted DEK including the single-use DEK encrypted by a public key (PK). The single-use DEK may be used only to encrypt the encrypted message. The operations also include transmitting, to a Key Access Control List Server (KACLS), a decryption request requesting the KACLS decrypt the encrypted DEK with a private key (PRK) associated with the PK. The decryption request may include the encrypted DEK. The KACLS is independent and/or separate from the message server. The operations also include receiving, from the KACLS, the single-use DEK and decrypting, using the single-use DEK, the encrypted message.

Implementations of the disclosure may include one or more of the following optional features. In some implementations, the decryption request is configured to cause the KACLS to obtain, from the message server, an encrypted PRK including the PRK encrypted by a private KACLS key, decrypt the encrypted PRK using the private KACLS key, decrypt the encrypted DEK using the PRK, transmit the single-use DEK to the user device, and discard the PRK. In some of these implementations, the private KACLS key includes a symmetric key possessed only by the KACLS.

In some examples, the decryption request is configured to cause the KACLS to authenticate a user of the user device with the message server and authenticate the user of the user device with a third party identity provider independent from the message server. Optionally, the operations further includes obtaining a second message; generating a second single-use DEK; encrypting the second message using the second single-use DEK; transmitting, to the KACLS, an encryption request requesting the KACLS encrypt the second single-use DEK with the PRK; receiving, from the KACLS, a second encrypted DEK including the second single-use DEK encrypted with the PRK; and transmitting the encrypted second message and the second encrypted DEK to the message server. In some implementations, the second message is obtained using the Secure/Multipurpose Internet Mail Extensions (S/MIME) standard.

In some examples, the message server does not receive access to the PRK or to the decrypted message. Optionally, the PK and the PRK include an asymmetric key pair. The message server may store the PK. In some implementations, the encrypted message includes an email and the message server includes an email service.

Another aspect of the disclosure provides a system for providing a hybrid content protection architecture. The system includes data processing hardware and memory hardware in communication with the data processing hardware. The memory hardware stores instructions that when executed on the data processing hardware cause the data processing hardware to perform operations. The operations include obtaining, from a message server, an encrypted message encrypted by a single-use data encryption key (DEK and an encrypted DEK including the single-use DEK encrypted by a public key (PK). The single-use DEK may be used only to encrypt the encrypted message. The operations also include transmitting, to a KACLS, a decryption request requesting the KACLS decrypt the encrypted DEK with a PRK associated with the PK. The decryption request may include the encrypted DEK. The KACLS is independent and/or separate from the message server. The operations also include receiving, from the KACLS, the single-use DEK and decrypting, using the single-use DEK, the encrypted message.

This aspect may include one or more of the following optional features. In some implementations, the decryption request is configured to cause the KACLS to obtain, from the message server, an encrypted PRK including the PRK encrypted by a private KACLS key, decrypt the encrypted PRK using the private KACLS key, decrypt the encrypted DEK using the PRK, transmit the single-use DEK to the user device, and discard the PRK. In some of these implementations, the private KACLS key includes a symmetric key possessed only by the KACLS.

In some examples, the decryption request is configured to cause the KACLS to authenticate a user of the user device with the message server and authenticate the user of the user device with a third party identity provider independent from the message server. Optionally, the operations further includes obtaining a second message; generating a second single-use DEK; encrypting the second message using the second single-use DEK; transmitting, to the KACLS, an encryption request requesting the KACLS encrypt the second single-use DEK with the PRK; receiving, from the KACLS, a second encrypted DEK including the second single-use DEK encrypted with the PRK; and transmitting the encrypted second message and the second encrypted DEK to the message server. In some implementations, the second message is obtained using the Secure/Multipurpose Internet Mail Extensions (S/MIME) standard.

In some examples, the message server does not receive access to the PRK or to the decrypted message. Optionally, the PK and the PRK include an asymmetric key pair. The message server may store the PK. In some implementations, the encrypted message includes an email and the message server includes an email service.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
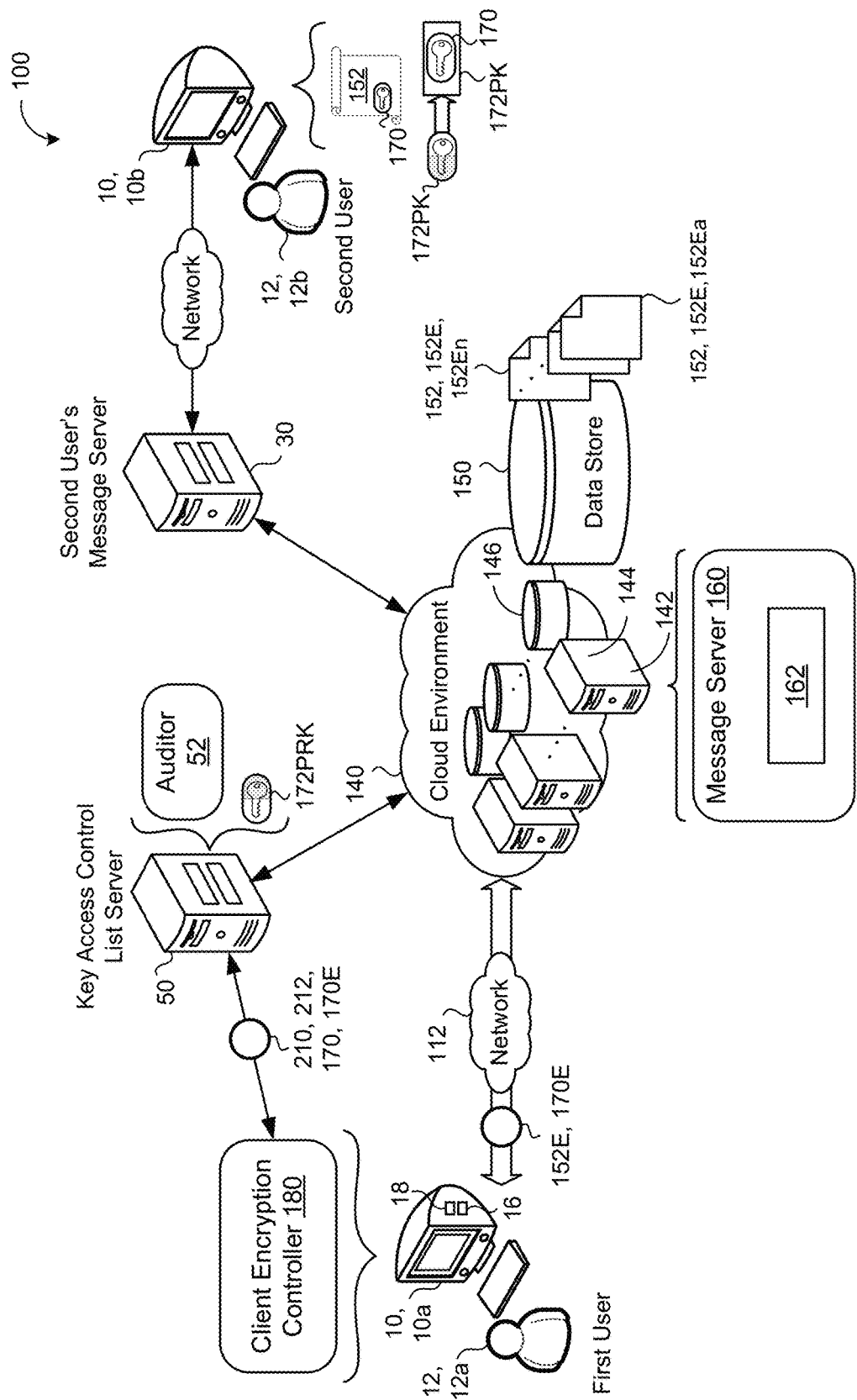
FIG. 1 is a schematic view of an example system for a hybrid content architecture for message sharing.

Encryption is increasingly one of the most important tools in use to ensure confidentiality and authenticity of messages between users. These messages are often passed through message servers (e.g., email servers) that are not under the control of the user sending and/or the user receiving the message. While the users can rely on the public email servers to encrypt messages, this allows the email servers access to the unencrypted messages. In order to maximize privacy, some users employ client-side encryption which involves users encrypting messages prior to sending the encrypted message to the message server for delivery.

However, client-side encryption relies on users being able to safely and easily share keys for decryption. This most commonly is accomplished via public-key cryptography, which consists of a public key (which may be shared with others) and a private key (which may not be shared with anyone but the owner). Data encrypted with the private key of the pair may only be decrypted by the associated public key, and similarly, data encrypted with the public key of the pair may only be decrypted using the private key. Private keys can also be used to perform a digital signature on the content and can be verified using the public key. Thus, when two users each share their respective public keys, the users may communicate safely as long as their respective private keys remain secret.

In this scenario, if the private key of one of the users is compromised by an adversary, the adversary not only gains access to all previous emails encrypted with the associated public key, the adversary also gains the ability to impersonate (i.e., via digital signatures) the user. Thus, maintaining the secrecy of the private key is of the utmost importance.

Users are increasingly relying on multiple devices to send and receive messages. For example, a user sends and receives emails via a mobile phone, a laptop, a desktop, and a tablet. In conventional client-side encryption schemes, the user must maintain a private key on each user device that the user uses for message sharing. Not only is this less than convenient for the user (who must ensure that each device remains up to date with the latest private key), but each device further increases the exposure risk to the private key(s). If an adversary gains access to any of the devices, the private key of that device may be compromised, allowing the adversary access to all messages decrypted by that key.

Implementations herein provide a hybrid content protection architecture for message sharing (e.g., email). The architecture includes a trusted key access control list server that is separate and independent from any message server a user employs to send and receive messages. The key access control list server provides the only access to the private key of the user, ensuring that the message server never has access to the private key or unencrypted messages and alleviates the burden from the user in maintaining the private key across multiple devices. The key access control server may additionally employ auditing features allowing the user detailed information on use of the private key and limiting damage in the event authentication credentials of the user are compromised.

Referring to FIG. 1, in some implementations, an example message protection system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 is configured to store a plurality of messages 152, 152a—n. In some examples, the messages 152 include emails, but any other sort of communications may also be stored (e.g., any textual, audio, and/or video messages). The data store 150 may store any number of messages 152 at any point in time. In some examples, as discussed in more detail below, some or all of the stored messages 152 are encrypted messages 152, 152E, 152Ea-n.

The remote system 140 executes a message server 160. The message server 160 (e.g., an email server or mail server) is configured to receive messages 152 from users 12 (via a user device 10) and deliver the messages 152 to other users 12. For example, the message server 160 may include an email server that sends and receives emails. The message server 160 may use any conventional techniques for sending and receiving messages 152 (e.g., simple mail transfer protocol (SMTP), Post Office Protocol version 3 (POP3), Internet Message Access Protocol (IMAP), HTTPS API, a custom protocol, etc.) and may include any number of sub-components (e.g., incoming message servers, outgoing message servers, list servers, policies, webmail servers, etc.).

The message server 160 is configured to receive messages 152 from a user device 10 associated with a respective user 12 via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The user 12 may draft and transmit the message 152 to the message server using a web browser, a standalone application executing on the user device 10, or any other suitable means.

In some implementations, a first user device 10, 10a of a first user 12, 12a executes a client encryption controller 180. The client encryption controller 180 obtains, from the message server 160, an encrypted message 152E. The encrypted message 152E was drafted by a second user 12, 12b using a second user device 10, 10b. In some examples, the second user 12b (via the second user device 10b) encrypts the encrypted message 152E using a single-use data encryption key (DEK) 170. The single-use DEK 170 represents an encryption key that is randomly generated to encrypt only a single message 152. After the message 152 is encrypted with the single-use DEK 170, the DEK 170, for security purposes, may not be used again (i.e., to encrypt another message 152).

The client encryption controller 180 also obtains an encrypted DEK 170, 170E along with the encrypted message 152E. The encrypted DEK 170E represents the single-use DEK 170 encrypted by a public key (PK) 172, 172PK. In some examples, the PK 172PK is an asymmetric public key. The asymmetric public key is associated with the user 12a who is the intended recipient of the message 152 (i.e., the first user 12a) and is linked with a PRK 172PRK owned by the first user 12a. Thus, gaining access to the encrypted message 152E requires decrypting the DEK 170E using the PRK 172PRK of the user 12a. The second user 12b may transmit the encrypted message 152E to the message server 160 via a message server 30 associated with the second user 12b. This message server 30 may be the same as the message server 160 of the first user 12a or an entirely different service. The second user 12b may encrypt the message 152 locally at the second user device 10b or rely on the message server 30 (although this allows the second user's message server 30 access to the unencrypted message 152).

The first user device 10a, after obtaining the encrypted message 152E and the encrypted DEK 170E, transmits, to a key access control list server (KACLS) 50, a decryption request 210. The decryption request 210 requests the KACLS 50 to decrypt the encrypted DEK 170E with the PRK 172PRK of the first user 12a. In some examples, the decryption request 210 includes the encrypted DEK 170E for the KACLS 50 to decrypt. Optionally, the KACLS is independent and separate from the message server 160. That is, the message server 160 does not have access to keys controlled by the KACLS 50. Similarly, the KACLS 50 does not have access to messages 152 stored, maintained, transmitted, or received by the message server 160. The KACLS 50 may operate on entirely independent hardware in communication with the message server 160 and/or the first user device 10a via a network.

The KACLS 50, using the PRK 172PRK (which is the private key associated with the PK 172PK used by the second user 12b to encrypt the DEK 170), decrypts the single-use DEK 170 used to encrypt the message 152. The first user device 10a receives, from the KACLS 50, the decrypted single-use DEK 170. The first user device 10a, using the decrypted single-use DEK 170 received from the KACLS 50, decrypts the message 152 for viewing by the first user 12a. In this way, the first user 12a gains access to the message 152 composed by the second user 12b without the message server 160 gaining access to the decrypted message 152 (as the message server 160 lacks access to the PRK 172PRK), without the KACLS 50 gaining access to the decrypted message 152 (as the KACLS 50 lacks access to the encrypted message 152E), and without the first user device 10a maintaining the PRK 172PRK locally.

Figure 2:
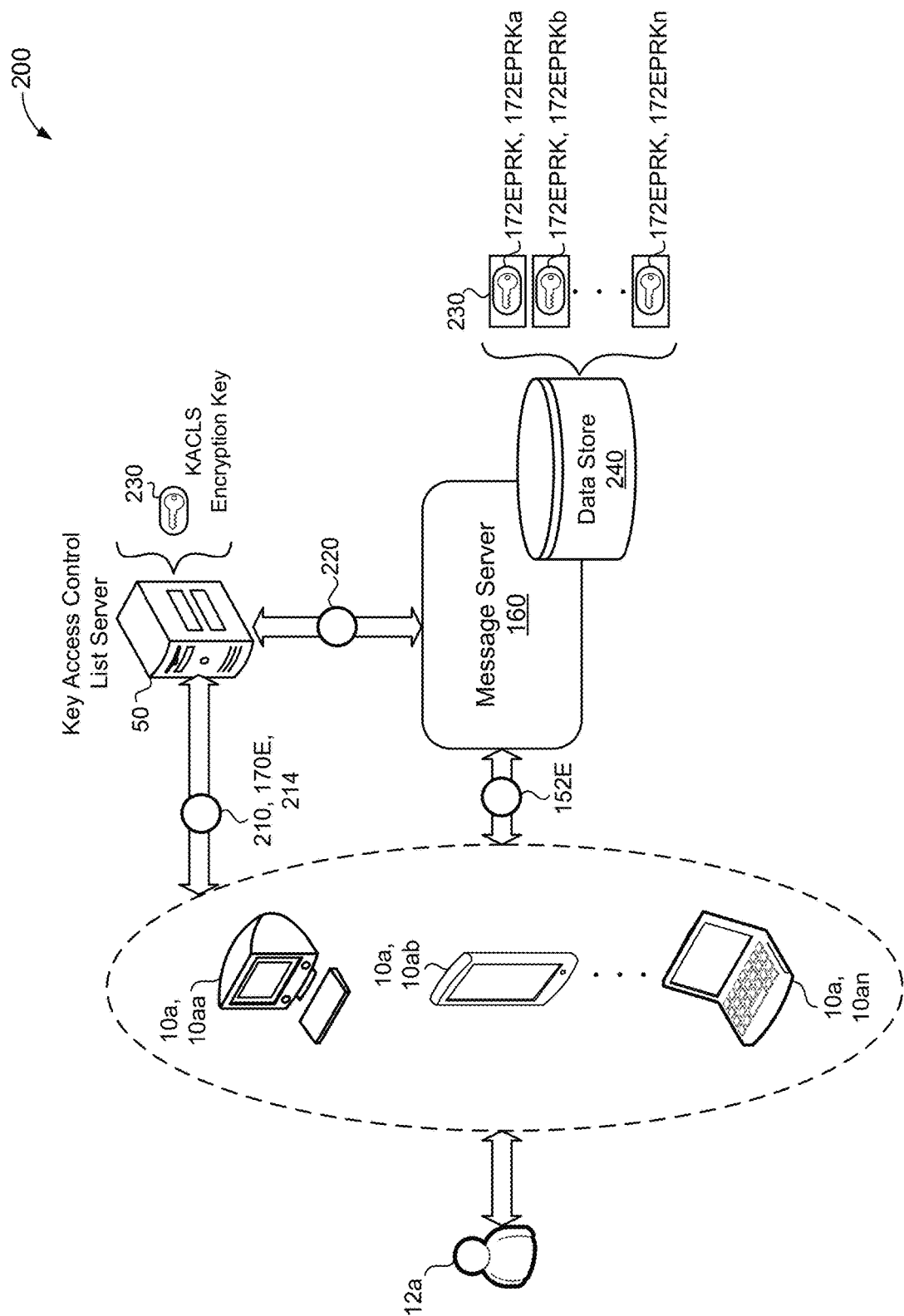
FIG. 2 is a schematic view of exemplary components for the system of FIG. 1.

Referring now to FIG. 2, as illustrated in schematic view 200, by relying on the KACLS 50, the user 12a is relieved of the responsibility of ensuring that each user device 10a, 10aa—an is provisioned with the same PRK 172PRK. Instead, the user 12a is free to any number of user devices 10 to decrypt encrypted messages 152E received from the message server 160. Each user device 10a of the first user 12a, instead of being provisioned with the PRK 172PRK, sends the decryption request 210 to the KACLS 50, which uses the PRK 172PRK to decrypt the encrypted single-use DEK 170E provided with the decryption request 210.

In some implementations, the KACLS 50 authenticates and/or authorizes the user device 10a and/or the user 12a prior to decrypting the DEK 170E. The KACLS 50 may request credentials 214 from the user 12a (e.g., a username and password, an authorization token, multi-factor authentication responses, etc.). In some examples, the KACLS 50 performs multiple authentication steps. For example, the KACLS 50 authenticates the user 12a and/or the user device 10a with the message server 160 (i.e., a service provider that provides the message server 160) in addition to authenticating the user 12a and/or the user device 10a via a third party identity provider that is independent from the KACLS 50 and the message server 160.

The KACLS 50, in some examples, stores a copy of the PRK 172PRK (e.g., in a database) for each user 12 that the KACLS 50 services. In these examples, the KACLS 50, in response to receiving a decryption request 210, retrieves the PRK 172PRK associated with the user 12 of the decryption request 210 from storage. In other examples, however, the KACLS 50 decrypts the DEK 170 in a stateless manner. That is, the KACLS 50 does not maintain a repository of the PRKs 172PRK. Instead, during an initialization or setup routine of provisioning or creating an account for the user 12a, the KACLS 50 encrypts the PRK 172PRK of the user 12a with a KACLS encryption key 230. The KACLS encryption key 230, for example, is a symmetric key available only to the KACLS 50. The KACLS 50 or the user 12a then provides an encrypted PRK 172EPRK (i.e., the PRK 172PRK encrypted by the KACLS encryption key 230) to the message server 160 which in turn stores the encrypted PRK 172EPRK on behalf of the user 12a. For example, the message server 160 includes a PRK data store 240 that stores the encrypted PRK 172EPRK, 172EPRKa-172EPRKn of each user 12 of the message server 160.

In these examples, in response to the user 12 sending the decryption request 210 to the KACLS 50, the KACLS 50 obtains, from the message server 160, the encrypted PRK 172EPRK. For example, the KACLS 50, using a key request 220, requests the appropriate encrypted PRK 172EPRK from the message server 160 (e.g., via a user ID or other identifier that identifies which encrypted PRK 172EPRK the message server 160 should retrieve). The decryption request 210 may include an identifier for identifying the encrypted PRK 172EPK the KACLS 50 should retrieve from the message server 160. The message server 160, which never has access to the decrypted PRK 172PRK, retrieves the encrypted PRK 172EPRK from the data store 240 and transmits the encrypted PRK 172EPRK to the KACLS 50. After receiving the encrypted PRK 172EPRK from the message server 160, the KACLS 50 decrypts the encrypted PRK 172EPRK using the KACLS encryption key 230. With the decrypted PRK 172PRK, the KACLS 50 may proceed with obtaining the decrypted single-use DEK 170 as described with regards to FIG. 1. That is, the KACLS 50 transmits the single-use DEK 170 to the user device 10. After recovering the decrypted single-use DEK 170, the KACLS 50 may discard (i.e., purge from memory) the decrypted PRK 172PRK such that the KACLS 50 must request the encrypted PRK 172EPRK from the message server 160 for future decryption requests 210. In some implementations, the KACLS 50 may maintain a cache that temporarily stores the encrypted PRK 172EPRK for a threshold period of time to reduce requests 210 to the message server 160.

In other examples, the message server 160, when delivering the encrypted message 152E and the encrypted DEK 170E to the user device 10a, also includes the encrypted PRK 172EPRK. That is, the message server 160 automatically includes the encrypted PRK 172EPRK with each encrypted message 152E delivered to the user device 10a. In these examples, the user device 10a includes the encrypted PRK 172EPRK along with the decryption request 210, allowing the KACLS 50 to recover the PRK 172PRK without having to query the message server 160.

Figure 3A:
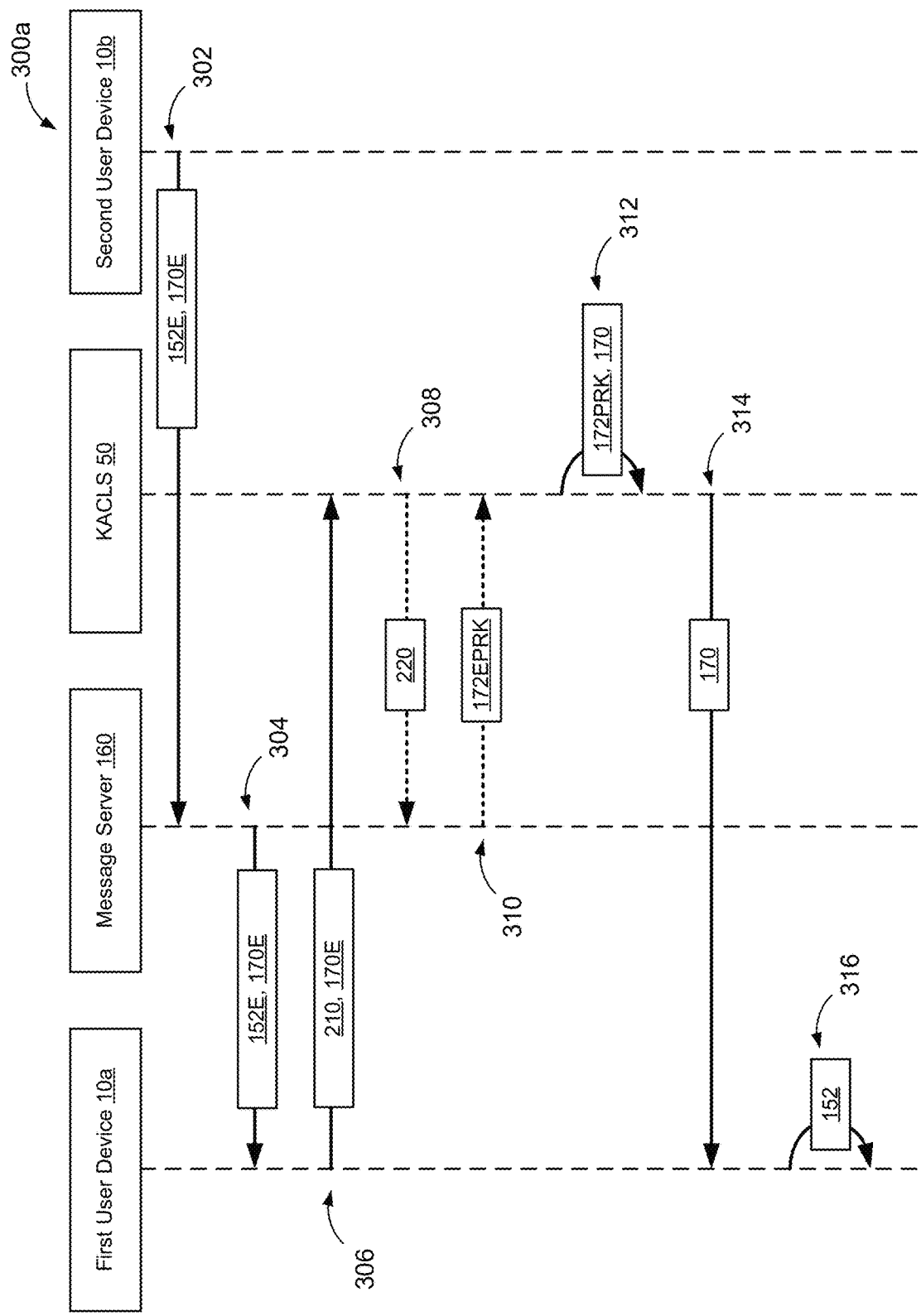
FIGS. 3A and 3B are sequence diagrams for the operation of the system of FIG. 1.

Referring now to FIG. 3A, a sequence diagram 300a provides an exemplary order of operations for the first user device 10a receiving and decrypting an encrypted message 152E transmitted by the second user device 10b. At operation 302, the second user device 10b (or, alternatively, a message server 30 on behalf of the second user device 10b) transmits the encrypted message 152E to the message server 160 of the first user 12a. The encrypted message 152E is accompanied by the encrypted DEK 170E used to encrypt the encrypted message 152E. The encrypted DEK 170E is encrypted using the PK 172PK of the first user 12a. At operation 304, the message server 160 delivers the encrypted message 152E and the encrypted DEK 170E to the first user device 10a. At operation 306, the first user device 10a transmits the decryption request 210 to the KACLS 50. In some examples, the decryption request 210 includes the encrypted DEK 170E and/or an identifier identifying the user 12a and/or the user device 10a. In some implementations, the KACLS 50 retrieves the encrypted DEK 170E from the message server 160. The KACLS 50 may perform one or more authentications/authorizations of the user device 10a and/or the user 12a. The decryption request 210 may include credentials 214 for authenticating the user device 10a or the user 12a.

Optionally, the KACLS 50, at operation 308, transmits the key request 220 to the message server 160. The key request 220 may include identification and/or authentication of the user 12a or the user device 10a. In response, at operation 310, the message server 160 provides the encrypted PRK 172EPRK to the KACLS 50. At operation 312, the KACLS 50 optionally decrypts the encrypted PRK 172EPRK and uses the decrypted PRK 172PRK to decrypt the encrypted DEK 170E. At operation 314, the KACLS 50 transmits the decrypted DEK 170 to the first user device 10a. Communications between the KACLS 50 and the first user device 10a may be further protected (e.g., via HTTPS) to ensure the confidentiality of the decrypted DEK 170. At operation 316, the first user device 10a uses the decrypted DEK 170 to decrypt the encrypted message 152E to obtain the decrypted message 152 originally composed by the second user 12b.

Referring back to FIG. 1, in some implementations, the KACLS 50 supports the user device 10a for encrypting composed messages 152 in a manner similar to decrypting received messages 152. For example, to allow the recipient of the message 152 (e.g., the second user 12b) to authenticate the source of a message 152, the first user 12a may rely on the KACLS 50 to digitally "sign" a message 152 by encrypting some or all of the message 152 or an attachment for the message using the PRK 172PRK. In this scenario, the first user 12a may compose the message 152 and then generate a random DEK 170 to encrypt the message 152 and/or attachment. The first user device 10a may transmit an encryption request 212 including the generated DEK 170 to the KACLS 50. The KACLS 50, after authenticating the user 12a and/or the user device 10a in a manner similar described above, encrypts the DEK 170 with the PRK 172PRK. The first user device 10a transmits the signed message 152S and the encrypted DEK 170E to the message server 160 for delivery to the recipient of the message 152 (e.g., the second user device 10b).

Figure 3B:
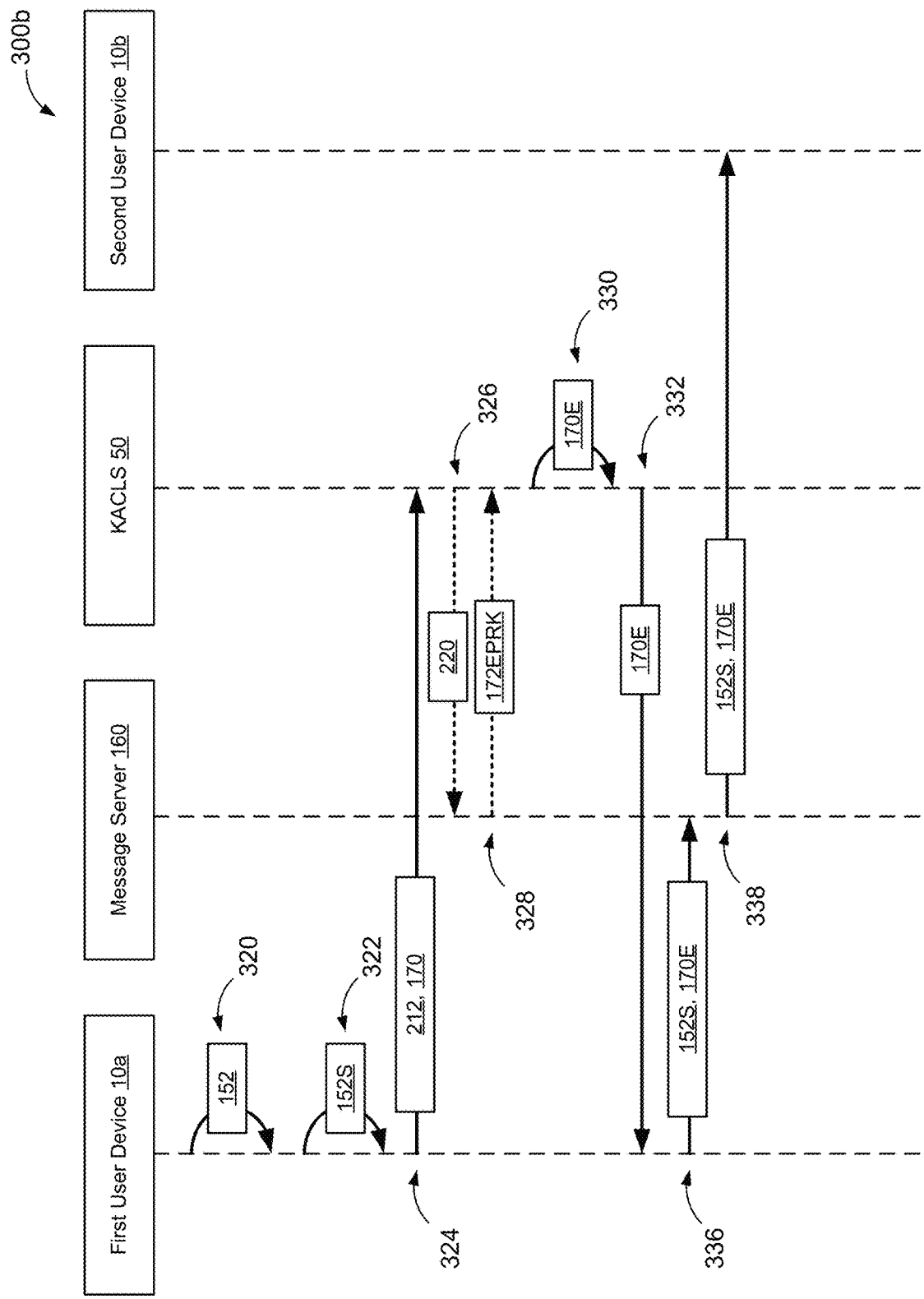

Referring now to FIG. 3B, a sequence diagram 300b provides an exemplary order of operations for the first user device 10a composing and signing/encrypting a message 152 for transmission to the second user device 10b. Here, at operation 320, the first user 12a, via the first user device 10a, composes a message 152 for transmission to the second user 12b. The first user device 10a generates a random single-use DEK 170 (i.e., a key that has not been used to encrypt previous communications) and, at operation 322, signs the message 152 with the DEK 170. The first user device 10a, at operation 324, transmits an encryption request 212 to the KACLS 50. The encryption request 212 may include the DEK 170.

In some implementations, the KACLS 50, at operation 326, sends a key request 220 to the message server 160 to retrieve the encrypted PRK 172EPRK associated with the first user 12a. At operation 328, the message server 160 returns the encrypted PRK 172EPRK associated with the first user 12a to the KACLS 50. The KACLS 50, at operation 330, encrypts the DEK 170 with the PRK 172PRK to generate an encrypted DEK 170E. At operation 332, the KACLS 50 returns the encrypted DEK 170E to the first user device 10a. At operation 336, the first user device 10a transmits the signed message 152S, along with the encrypted DEK 170E, to the message server 160. The message server 160, at operation 338, delivers the signed message 152S and the encrypted DEK 170E to the second user device 10b (or, alternatively, another message server 30 associated with the second user 12b). The second user device 10b may decrypt the encrypted DEK 170E using the PK 172PK associated with the first user 12a, thus ensuring authenticity of the message 152 (i.e., a digital signature) without revealing the first user's PRK 172PRK to the message server 160. While not shown here, it is understood that the first user device 10a may additionally or alternatively encrypt the message 152 using, for example, a PK 172PK associated with the second user 12b to ensure confidentiality.

Referring back to FIG. 1, in some examples, the first user device 10a executes a client encryption controller 180, but the second user device 10b does not. In these scenarios, the system 100 may implement various features of, for example, the Secure/Multipurpose Internet Mail Extensions (S/MIME) standard to ensure interoperability for messages communicated between the first user device 10a and the second user device 10b. In this way, the system 100 does not require each user device 10 to execute a client encryption controller 180 and instead the system may be integrated with conventional client-side encryption techniques. In other examples, both the first user device 10a and the second user device 10b execute separate client encryption controllers 180 such that both perform operations similar to those described in FIGS. 3A and 3B when transmitting and receiving messages from the other user device 10. In these examples, the message server 160 may service both users 12a, 12b (e.g., both users 12a, 12b subscribe to the same email service). The system 100 may support any number of symmetric ciphers (e.g., AES-256-GCM, AES-128-GCM, AES-256-CBC, AES-128-CBC, ChaCha20-Poly1305, 3DES, etc.) and asymmetric ciphers (e.g., ECDH, RSA, SHA-256, MD5, etc.).

In some examples, the message server 160 maintains a directory or listing 162 of PKs 172PK to facilitate message sending between the first user 12*a* and the second user 12*b*. For example, the message server 160 maintains a list 162 that associates PKs 172PK (and/or certificates) with specific users 12. In this way, the client encryption controller 180 may query the message server 160 to obtain the public key 172PK of another user 12 for encryption or decryption of messages 152.

In some implementations, the KACLS 50 includes an auditor 52. The auditor 52, in some examples, monitors and records all usage of the PRK 172PRK. For example, the auditor 52, when receiving a decryption request 210 or encryption request 212, logs information related to the requests, such as a date and time, user identification, purpose of the request, etc. Thus, in the event of a compromise, the logs may be reviewed (e.g., by authorized users 12) to determine an extent of the damage. In some examples, the auditor 52 enforces access controls for the PRK 172PRK. For example, every authorized user 12 of the PRK 172PRK may be associated with a role that limits the scope of their use of the PRK 172PRK. For example, a user 12 with a role of "signer" may only be allowed to sign messages 152 using the PRK 172PRK. As another example, a user 12 with a role of "decrypter" may only be allowed to decrypt encrypted messages 152E using the PRK 172PRK, but not perform other actions (e.g., sign). The auditor 52 may confirm the role of the user 12 when authentication/authorizing the user 12 via the credentials 214. The auditor 52 may perform a variety of other security roles. For example, the auditor 52 performs certificate validation to confirm that Transport Layer Security (TLS) certificate chains are valid.

In some implementations, the KACLS 50 includes a hardware security module (HSM) or key management service (KSM). In these implementations, the KACLS 50, after authentication and/or authorizing the user 12*a* and/or the user device 10*a*, leverages the HSM/KSM to perform encryption/decryption operations. The HSM may be a physical computing device configured to manage and protect digital keys with various means of tamper resistance. The HSM may be external to the KACLS 50 and the KACLS 50 may transmit the encryption/decryption requests to the HSM. In this way, the KACLS 50 may primarily serve as an identity authentication/verification gateway for the user 12*a* to access the HSM. That is, because HSMs typically require complicated levels of trust to be established for communications (e.g., server to server communications), the KACLS 50 may act as a gateway for the user 12*a* to access the HSM's encryption and decryption functions.

Figure 4:
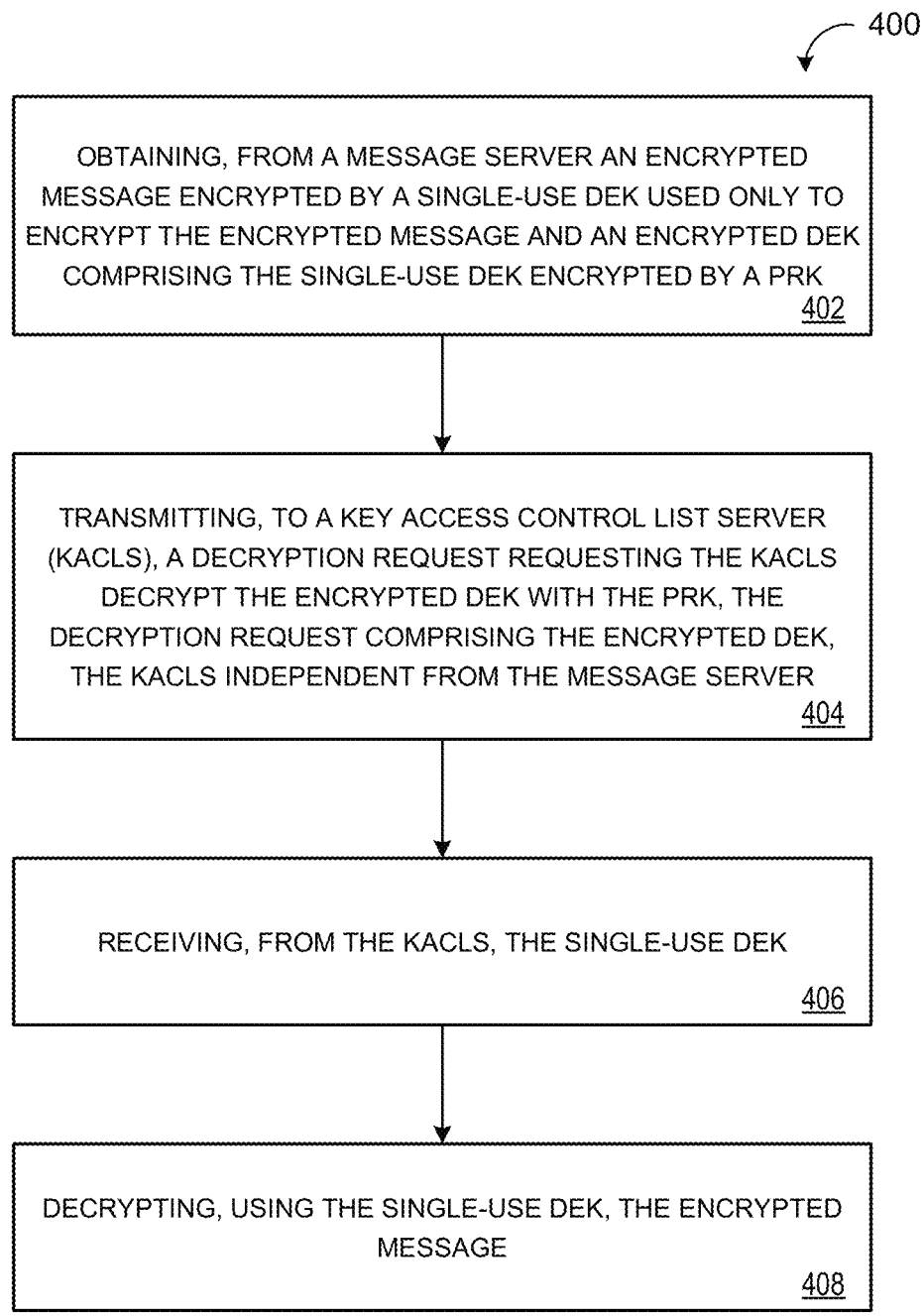
FIG. 4 is a flowchart of an example arrangement of operations for a method of providing a hybrid content architecture for message sharing.

FIG. 4 is a flowchart of an exemplary arrangement of operations for a method 400 of providing a hybrid content protection architecture for transmitting encrypted messages. The computer-implemented method 400, when executed by data processing hardware 18 of a user device 10, causes the data processing hardware 18 to perform operations. The method 400, at operation 402, includes obtaining, from a message server 160, an encrypted message 152E encrypted by a single-use DEK 170. The single-use DEK is used only to encrypt the encrypted message 152E. Operation 402 also includes obtaining an encrypted DEK 170E that includes the single-use DEK 170 encrypted by a PK 172PK. At operation 404, the method 400 includes transmitting, to a KACLS 50, a decryption request 210 requesting the KACLS 50 decrypt the encrypted DEK 170E with a PRK 172PRK associated with the PK 172PK. The decryption request 210 may include the encrypted DEK 170E. The KACLS 50 is independent from the message server 160. At operation 406, the method 400 includes receiving, from the KACLS 50, the single-use DEK 170. The method 400, at operation 408, includes decrypting, using the single-use DEK 170, the encrypted message 152E.

Figure 5:
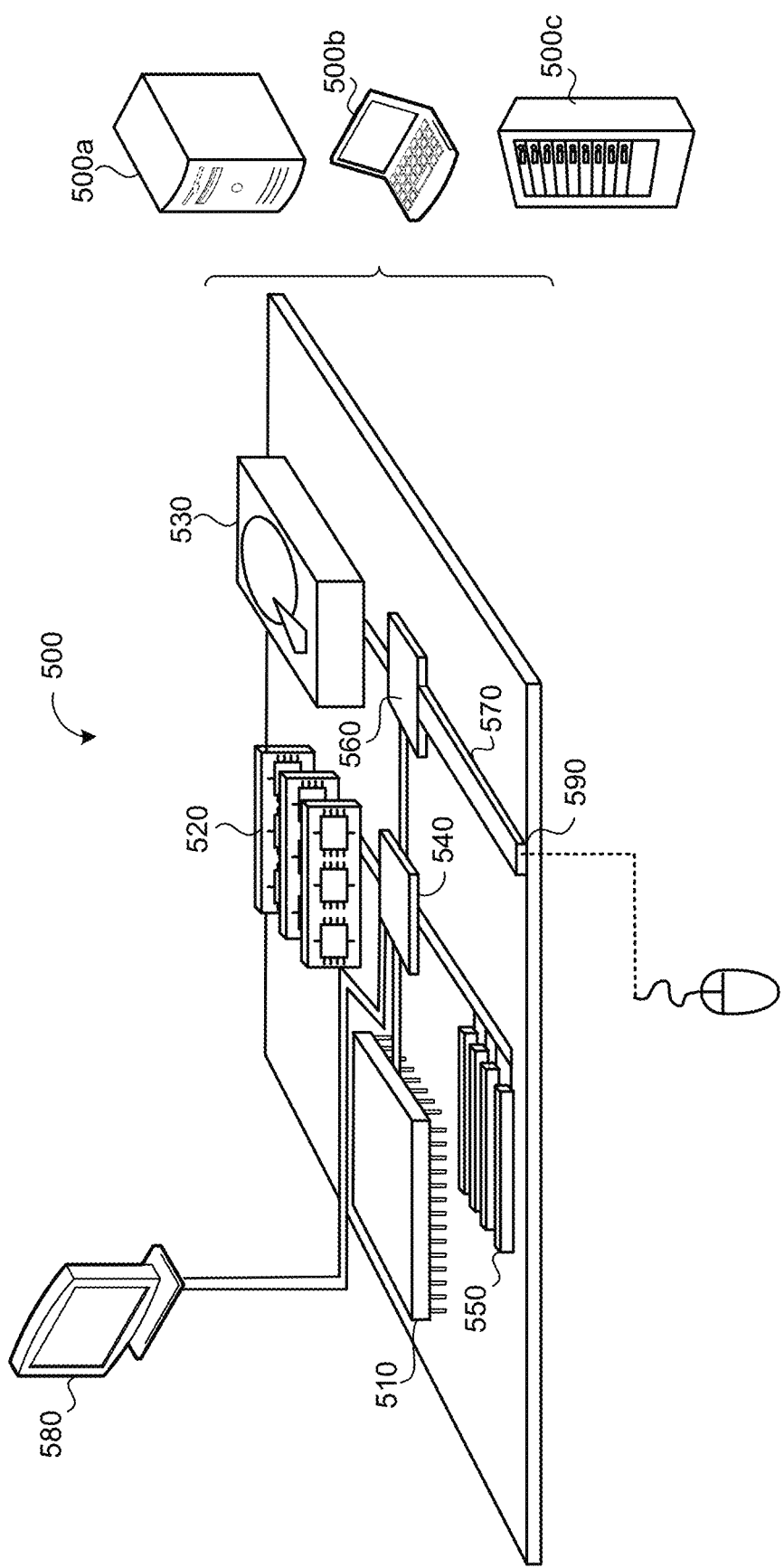
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware of a user device causes the data processing hardware to perform operations comprising:
    generating a single-use data encryption key (DEK);
    signing a message with the single-use DEK;
    transmitting, to a key access control list server (KACLS), an encryption request comprising the single-use DEK;
    after transmitting the encryption request to the KACLS, receiving, from the KACLS, an encrypted single-use DEK encrypted by a private key associated with a user of the user device; and
    transmitting, to a message server independent from the KACLS, the signed message and the encrypted single-use DEK.

2. The computer-implemented method of claim 1, wherein the single-use DEK has not been used to encrypt any previous messages.

3. The computer-implemented method of claim 1, wherein the encryption request is configured to cause the KACLS to:
 obtain, via the message server, an encrypted private key encrypted by a KACLS encryption key;
 decrypt the encrypted private key using the KACLS encryption key;
 encrypt the single-use DEK with the private key; and
 return the encrypted single-use DEK to the user device.

4. The computer-implemented method of claim 1, wherein the signed message and the encrypted single-use DEK are configured to cause the message server to send the signed message and the encrypted single-use DEK to a second user device.

5. The computer-implemented method of claim 4, wherein the signed message and the encrypted single-use DEK are configured to cause the second user device to decrypt the encrypted single-use DEK using a public key associated with the user.

6. The computer-implemented method of claim 4, wherein the operations further comprise encrypting the message with a public key associated with a second user associated with the second user device.

7. The computer-implemented method of claim 1, wherein the encryption request is configured to cause the KACLS to:
 authenticate the user of the user device with the message server; and
 authenticate the user of the user device with a third party identity provider independent from the message server.

8. The computer-implemented method of claim 1, wherein the encryption request is configured to cause the KACLS to log information associated with the encryption request.

9. The computer-implemented method of claim 8, wherein the logged information comprises at least one of:
 a date and time of the encryption request;
 a user identification; or
 a purpose of the encryption request.

10. The computer-implemented method of claim 1, wherein:
 the signed message comprises an email; and
 the message server comprises an email service.

11. A system comprising:
 data processing hardware of a user device; and
 memory hardware in communication with the data processing hardware, the memory hardware storing instructions that when executed on the data processing hardware cause the data processing hardware to perform operations comprising:
  generating a single-use data encryption key (DEK);
  signing a message with the single-use DEK;
  transmitting, to a key access control list server (KACLS), an encryption request comprising the single-use DEK;
  after transmitting the encryption request to the KACLS, receiving, from the KACLS, an encrypted single-use DEK encrypted by a private key associated with a user of the user device; and
  transmitting, to a message server independent from the KACLS, the signed message and the encrypted single-use DEK.

12. The system of claim 11, wherein the single-use DEK has not been used to encrypt any previous messages.

13. The system of claim 11, wherein the encryption request is configured to cause the KACLS to:
 obtain, via the message server, an encrypted private key encrypted by a KACLS encryption key;
 decrypt the encrypted private key using the KACLS encryption key;
 encrypt the single-use DEK with the private key; and
 return the encrypted single-use DEK to the user device.

14. The system of claim 11, wherein the signed message and the encrypted single-use DEK are configured to cause the message server to send the signed message and the encrypted single-use DEK to a second user device.

15. The system of claim 14, wherein the signed message and the encrypted single-use DEK are configured to cause the second user device to decrypt the encrypted single-use DEK using a public key associated with the user.

16. The system of claim 14, wherein the operations further comprise encrypting the message with a public key associated with a second user associated with the second user device.

17. The system of claim 11, wherein the encryption request is configured to cause the KACLS to:
 authenticate the user of the user device with the message server; and
 authenticate the user of the user device with a third party identity provider independent from the message server.

18. The system of claim 11, wherein the encryption request is configured to cause the KACLS to log information associated with the encryption request.

19. The system of claim 18, wherein the logged information comprises at least one of:
 a date and time of the encryption request;
 a user identification; or
 a purpose of the encryption request.

20. The system of claim 11, wherein:
 the signed message comprises an email; and
 the message server comprises an email service.

* * * * *